A. HART.
LAWN TRIMMER.
APPLICATION FILED JUNE 19, 1916.
1,202,384.
Patented Oct. 24, 1916.
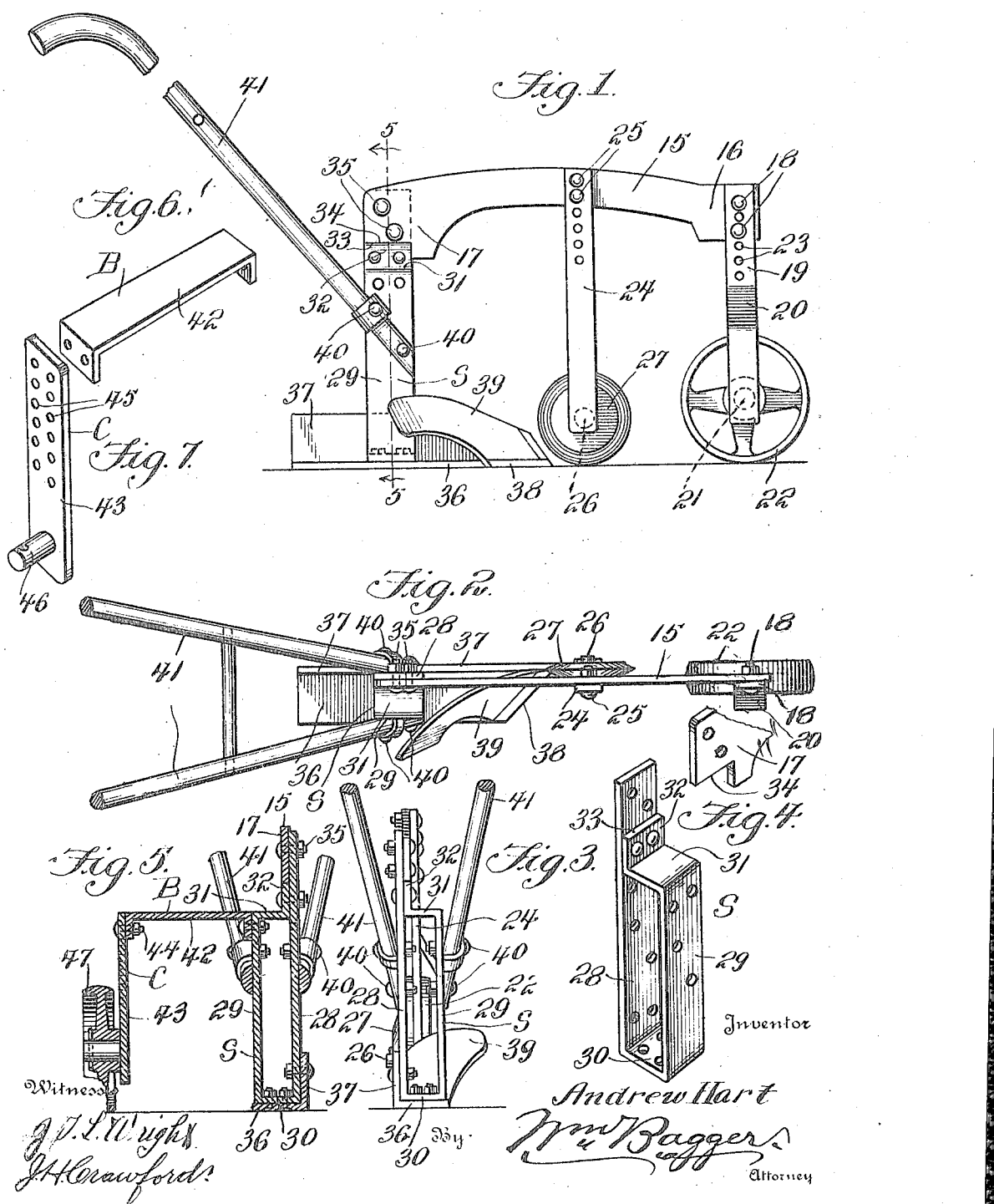

UNITED STATES PATENT OFFICE.

ANDREW HART, OF SAGINAW, MICHIGAN.

LAWN-TRIMMER.

1,202,384.

Specification of Letters Patent.　Patented Oct. 24, 1916.

Application filed June 19, 1916.　Serial No. 104,588.

*To all whom it may concern:*

Be it known that I, ANDREW HART, a citizen of the United States, residing at Saginaw, in the county of Saginaw and State of Michigan, have invented certain new and useful Improvements in Lawn-Trimmers, of which the following is a specification.

This invention relates to lawn trimmers, and it has for its object to produce a simple and improved device for trimming the edges of lawns adjacent to sidewalks, paths and the like in streets, parks and public or private gardens.

The invention has for its object to produce a simple, light and efficient device partaking somewhat of the nature of a plow whereby the edge of a lawn may be accurately and smoothly trimmed, a narrow ditch being formed between the lawn and the path or sidewalk adjacent thereto on which the slice of dirt and sod removed by the trimmer will be turned to enable it to be afterward conveniently removed.

A further object of the invention is to produce a simple and effective device of the class described having a guide wheel to support it in a standing position, said guide wheel and its supporting bracket being detachably mounted so that it may be dispensed with when desired.

A further object of the invention is to produce a device of the class described having a rotary cutter operating in advance of the plow or turning device to enable a smooth cut to be made.

A further object of the invention is to simplify and improve the construction and arrangement of the detailed parts of the device.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a side elevation of a device constructed in accordance with the invention. Fig. 2 is a top plan view of the same, the guide wheel having been detached. Fig. 3 is a rear elevation of the device as seen in Fig. 2. Fig. 4 is a perspective detail view of the standard detached, showing also the rear end portion. Fig. 5 is a vertical sectional view taken on the line 5—5 in Fig. 1. Fig. 6 is a perspective detail view of the bracket that serves to carry the standard of the guide wheel. Fig. 7 is a perspective detail view of the guide wheel standard.

Corresponding parts in the several figures are denoted by like characters of reference.

The beam 15 of the improved device is preferably constructed of sheet metal of suitable thickness to give it the requisite strength, although it will, of course, be understood that other material may be used. The said beam is provided at its front and rear ends with enlarged portions or heads designated, respectively, by 16 and 17. The front head 16 is apertured for the passage of fastening members such as bolts 18 serving for the attachment of a vertical standard 19 having intermediate its upper and lower ends an offset 20, whereby the lower end portion of said standard is offset laterally, said lower end portion being provided with a spindle 21 on which a gage wheel 22 is supported for rotation, said gage wheel being thus positioned directly beneath the front portion of the beam 15. The shank or standard 19 is provided with a plurality of apertures 23 for the passage of the bolts 18, thus permitting the wheel carrying shank or standard to be adjusted vertically.

Secured adjustably to the beam 15 intermediate the front and rear ends thereof is a shank or standard 24 having a plurality of apertures for the passage of the fastening members 25 which enable the shank or standard to be raised or lowered. The shank 24 has a spindle 26 on which a circular or disk-formed cutting member 27 is mounted for rotation, said cutting member being positioned in a vertical plane adjacent to and slightly spaced from that of the beam 15.

S is a standard which is formed of a strap or bar of metal by bending the same to form a rectangular frame having side members, one of which, 28, is relatively long, the other side member, 29, being relatively short, said side members being connected at their lower ends by a cross piece 30. The short side member 29 is bent at its upper end to form the upper cross piece 31 which is provided with a terminal lug 32 which is riveted upon or otherwise suitably connected with the side member 28, said lug forming at its upper extremity a shoulder or offset 33 which is adapted to engage a notch 34 formed in the lower portion of the rearward head 17 of the beam. The upper extremity of the side member 28 of the standard will abut on one side face of the head member 17 with which it is connected by means of bolts 35. By this construction a very light and durable standard is formed, said standard consisting of an open frame through which dirt, roots, gravel and the like may pass, if such should happen to fall in front of the standard, thereby avoiding obstruction to the forward passage of the implement.

The plow or cutter is composed of an angle bar having a horizontal flange 36 and a vertical upstanding flange 37, the horizontal flange 36 constituting a foot piece or shoe, while the upstanding flange 37 constitutes a landside member. The forward end of the shoe member 36 is cut off to present an oblique cutting edge 38 from which the mold board 39 is curved upwardly and outwardly, as shown. It will be understood that the entire width of the plow will not exceed a few inches, although, of course, the dimensions may be varied to any desired or reasonable extent.

The side members of the standard are apertured for the passage of suitable fastening members, whereby the handles 41 are mounted in position, it being understood that such handles may be round, flat or of any desired shape, and also that the construction of said fastening members for said handles may be varied.

Secured on the outer face of the short side member of the standard is a bracket 42 which may consist of a bar having down-turned ends or lugs, the outer end of said bracket carrying a vertically disposed standard or shank 43 which is adjustably connected with the bracket by means of bolts 44 for the passage of which the said shank is provided with a plurality of apertures 45. The shank 43 carries at its lower end a spindle 46 on which a guide wheel 47 is mounted for rotation. It will be seen that by proper adjustment of the shank 43 the guide wheel may be supported at any desired elevation, as might be required, especially when the lawn the edge of which is to be trimmed is sloping or slanting.

From the foregoing description taken in connection with the drawing hereto annexed, the operation and advantages of this invention will be readily understood.

The implement which is extremely light and compact may be readily pushed by the operator who lays hold of the handles. The gage wheel 22 travels in advance; the cutter 27 serves to form a vertical incision in the sod in alinement with the landside of the plow, and the plow following behind will turn the narrow strip which has been loosened by the rotary cutter, thus presenting a narrow shallow ditch from which the roots of the lawn grass will be thoroughly removed, thus causing the lawn to present a neat and trim appearance. When the guide wheel is used, as in Figs. 1 and 5 of the drawings, it will serve to support the implement in an upright position if the operator should let go of the handles. This guide wheel, however, while a desirable adjunct to the device may be dispensed with, as seen in Figs. 2 and 3.

The implement may be manufactured at a very moderate expense, and it has proven to be thoroughly efficient for the purposes for which it is provided.

Having thus described the invention, what is claimed as new is:—

In a lawn trimmer, a beam having enlarged end portions forming heads, the rear head having a notch, a standard consisting of a rectangular frame having a relatively long and a relatively short side member and bottom and top cross pieces, the top cross piece having a lug secured on the long side member to present a shoulder engaging the notch in the rearward head of the beam, and fastening members securing the long side member of the standard on said rearward head in engagement with one side face thereof.

In testimony whereof I affix my signature in presence of two witnesses.

ANDREW HART.

Witnesses:
 JOHN HOPKINS,
 A. J. LOUDEN.